(12) United States Patent
Rasras (10) Patent No.: US 8,699,834 B2
(45) Date of Patent: Apr. 15, 2014

(54) BANDWIDTH ADJUSTABLE BANDPASS FILTER

(75) Inventor: Mahmoud Rasras, Berkeley Heights, NJ (US)

(73) Assignee: Alcatel Lucent, Paris (FR)

( * ) Notice: Subject to any disclaimer, the term of this patent is extended or adjusted under 35 U.S.C. 154(b) by 357 days.

(21) Appl. No.: 13/023,173

(22) Filed: Feb. 8, 2011

(65) Prior Publication Data

US 2012/0189310 A1      Jul. 26, 2012

Related U.S. Application Data

(60) Provisional application No. 61/434,688, filed on Jan. 20, 2011.

(51) Int. Cl.
  *G02B 6/26*       (2006.01)
  *G02F 1/01*       (2006.01)

(52) U.S. Cl.
  USPC .................................................. 385/27; 385/1

(58) Field of Classification Search
  None
  See application file for complete search history.

(56) References Cited

U.S. PATENT DOCUMENTS 7,257,291 B1 *   8/2007   Rasras ........................ 385/27
8,588,556 B1 *   11/2013  Dong ............................ 385/3

FOREIGN PATENT DOCUMENTS

WO      WO 2009048572 A1 *   4/2009

* cited by examiner

*Primary Examiner* — Sarah Hahm
(74) *Attorney, Agent, or Firm* — Hitt Gaines, PC (57) ABSTRACT

An apparatus comprising a Mache-Zehnder interferometer. The Mache-Zehnder interferometer comprises: a 1×2 optical splitter having an optical input, a 2×2 optical coupler having first and second optical outputs, two optical waveguide arms end-connecting each optical output of the 1×2 optical splitter to a corresponding optical input of the 2×2 optical coupler, a variable optical phase shifter on one of the waveguide arms and a plurality of optical resonators, each optical resonator being controllably coupled along one of the optical waveguide arms. An optical path length between the optical input of the 1×2 optical coupler and the first optical output of the 2×2 optical coupler is substantially the same via the first optical waveguide arm and the second optical waveguide arm when the optical resonators are decoupled from the optical waveguide arms.

27 Claims, 5 Drawing Sheets

BANDWIDTH ADJUSTABLE BANDPASS FILTER

CROSS RELATED APPLICATION

This application claims the benefit of U.S. Provisional Application Ser. No. 61/434,688, filed by Mahmoud Rasras on Jan. 20, 2011, entitled "A BANDWIDTH ADJUSTABLE BANDPASS," commonly assigned with this application and incorporated herein by reference.

TECHNICAL FIELD

The present disclosure is directed, in general, to optical devices and more specifically, optical wavelength filters, and, methods of using and manufacturing the same.

BACKGROUND

This section introduces aspects that may be helpful to facilitating a better understanding of the inventions. Accordingly, the statements of this section are to be read in this light. The statements of this section are not to be understood as admissions about what is in the prior art or what is not in the prior art.

Reconfigurable optical add/drop multiplexer network architectures often use arrays of tunable bandpass optical filters to add or drop a wavelength into or out of a network. The tunable bandpass optical filters should ideally have a box-like frequency response with fast roll-off skirt, should be physically small and should have low insertion loss.

Reconfigurable optical add/drop multiplexer network architectures also often require the use of a tunable bandpass optical filter for wavelength grooming. Free-space or MEMS based bandpass filters are widely used in such cases. Sometimes it can be difficult to make such filters tunable in bandwidth, and to integrate these filters with other network components.

SUMMARY OF THE INVENTION

To address some of the above-discussed limitations, one embodiment is an apparatus comprising a Mache-Zehnder interferometer. The Mache-Zehnder interferometer comprises: a 1×2 optical splitter having an optical input, a 2×2 optical coupler having first and second optical outputs, two optical waveguide arms end-connecting each optical output of the 1×2 optical splitter to a corresponding optical input of the 2×2 optical coupler, a variable optical phase shifter on one of the waveguide arms and a plurality of optical resonators, each optical resonator being controllably coupled along one of the optical waveguide arms. An optical path length between the optical input of the 1×2 optical coupler and the first optical output of the 2×2 optical coupler is substantially the same via the first optical waveguide arm and the second optical waveguide arm when the optical resonators are decoupled from the optical waveguide arms.

Another embodiment is a method of using an optical device. The method comprises splitting a light beam into a first beam that passes through a first waveguide arm of a waveguide portion of a Mache-Zehnder interferometer and into a second beam that passes through a second waveguide arm of the waveguide portion of the bandpass filter. The method also comprises passing the first beam through at least one of two or more optical resonators optically couplable to the first waveguide arm. A first one of the optical resonators has a different free spectral range than a second one of the optical resonators. A total optical path length of the second waveguide arm is substantially equal to a sum of the optical path half-lengths of the optical resonators couplable to the first arm plus a total optical path length of the first waveguide arm. A passband bandwidth of the Mache-Zehnder interferometer, when the at least one optical resonator is optically coupled to the first waveguide arm, is different than when one of the other optical resonators is optically coupled to the first waveguide arm.

BRIEF DESCRIPTION OF THE DRAWINGS

Various embodiments are better understood from the following detailed description, when read with the accompanying FIGUREs. Some features in the figures may be described as, for example, "top," "bottom," "vertical" or "lateral" for convenience in referring to those features. Such descriptions do not limit the orientation of such features with respect to the natural horizon or gravity. Various features may not be drawn to scale and may be arbitrarily increased or reduced in size for clarity of discussion. Reference is now made to the following descriptions taken in conjunction with the accompanying drawings, in which.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Figure 1A:
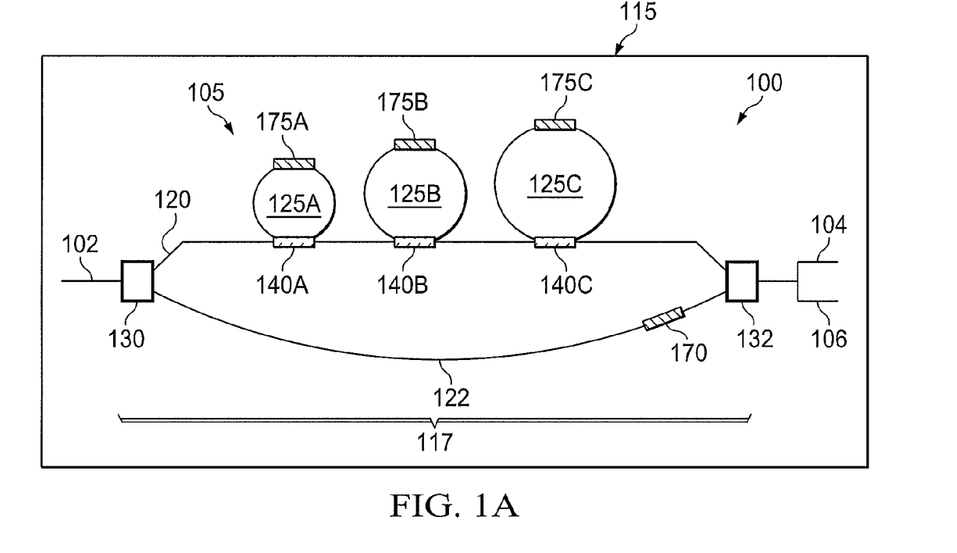
FIG. 1A presents a schematic layout diagram of an example of a Mache-Zehnder interferometer (MZI) that functions as power splitter.

FIG. 1A presents a layout diagram of an example of an apparatus 100 comprising a planar Mache-Zehnder interferometer (MZI) 105 with, at least, an optical input 102 and two optical outputs 104, 106. Each optical output 104, 106 of the MZI 105 can function as a bandpass filter. The MZI 105 includes 1×2 optical splitter 130, a 2×2 optical coupler 132, first and second optical waveguide arms 120, 122, and an optical phase shifter 170. The MZI 105 is located on a planar surface of a substrate 115.

The 1×2 optical splitter 130 may be any conventional type of optical splitter. For example, the 1×2 optical splitter 30 may be a conventional planar 50/50 power splitter that transmits about equal intensities to each output thereof. The 1×2 optical splitter 130 delivers light of about the same phase to the first and second optical waveguide arms 120, 122.

The 2×2 optical combiner 132 is, e.g., a conventional optical combiner. But, the 2×2 optical combiner 30 combines light, which is received at its first and second optical inputs, with different phases at its first and second optical outputs 104, 106. In particular, light from the two inputs is interfered with a specific phase at the first optical output 104, which depends on the setting of the optical phase shifter 170, and said light is interfered with the specific phase plus about π radians at the second output.

The first optical waveguide arm 120 connects between a first output of the 1×2 optical splitter 130 and the first optical input of the 2×2 optical coupler 132. The second optical waveguide arm 122 connects between the second output of the 1×2 optical splitter 130 and the second optical input of the 2×2 optical coupler 132. The phase shifter 170 is located along a segment of the second optical waveguide arm 122.

The first waveguide arm 120 includes a series of two or more variably-coupled optical resonators (e.g., optical resonators 125A, 125B, 125C). Each optical resonator 125A-125C includes an adjustable coupler 140A, 140B, 140C and may or may not also include an optical phase shifter 175A, 175B, 175C on an internal loop therein. The different optical resonators (e.g., first resonator 125A) have different free spectral ranges.

The term free spectral range as used herein refers to the spectral frequency spacing between resonance frequencies of a device, e.g., the bandpass filter 105 when one of the optical resonators (e.g., optical resonators 125A-125C) is optically coupled to the first arm 120.

In addition, the first waveguide arm 120 has a total optical path length that depends on the coupling states of the two or more optical resonators 125A, 125B, 125C. In particular, the first and second waveguide arms 120, 122 have total optical path lengths that are substantially equal when each optical resonators 125A-125C is minimally coupled to the first waveguide arm 120. When the optical resonators 125A-125C are minimally coupled, the MZI 105 operates in a substantially wavelength-independent manner due to the substantial equality of the optical path lengths of the two waveguide arms 120, 122 for a range of settings of the optical phase shifter 170. For such minimal couplings and a specific stetting range of the optical phase shifter 170, the ratio of the power transmitted to the first optical output 104 over the power transmitted to the second optical output 106 will vary by a small percentage over the telecommunications C band or preferably over a combination of the telecommunications C and L bands. Indeed, the small percentage will be 10% or less, will usually be 5% or less, and preferably will be 2%.

The optical phase shifter 170 can make small variations of the optical path length of the second optical waveguide arm 122 during operation, e.g., variations about a single wavelength or less. For example, the variations may result from heating via a resistive heater or due to an electro-optical response to an applied voltage.

The setting of the optical phase shifter 170 directly influences interference of light in the 2×2 optical coupler 132. Indeed, the above-described substantial wavelength-independence of the MZI 105 when the optical resonators 125A-125C are minimally coupled may depend on the setting of the optical phase shifter 170. In particular, the above limitations on the percentage variation of the ratio of the transmitted powers is typically satisfied if, at one wavelength of the telecommunications C band, the optical phase shifter 170 is set so that the powers transmitted by the output ports 104, 106 are comparable in magnitude, e.g., differ by less than 50%.

Figure 1B:
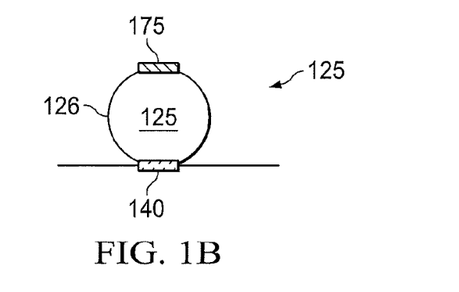
FIG. 1B schematically illustrates one embodiment for the optical resonators of FIG. 1A.
Figure 1C:
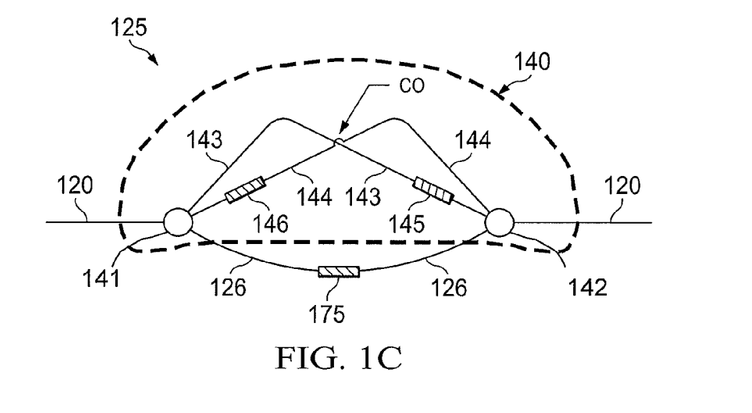
FIG. 1C is a top view illustrating physical relationships between waveguides in an example of the optical resonator of FIG. 1B.

FIGS. 1B and 1C illustrate an embodiment for the optical resonators 125A-125C of FIG. 1A. The optical resonator 125 includes an optical waveguide loop 126 and a controllable MZI coupler 140 whose layout is encircled by a dashed line in FIG. 10.

The controllable MZI coupler 140 determines the coupling-state of the waveguide loop 126 with respect to the optical waveguide arm 120. The controllable MZI coupler 140 has two 2×2 optical splitters 141, 142 and two internal waveguide arms 143, 144. The 2×2 optical splitters 141, 142 may be, e.g., 50/50 power splitters. The two internal waveguide arms 143, 144 have a cross-over (CO), which enables the optical path length L2 between the input and output of the controllable MZI coupler 140 via each optical waveguide arm 143, 144 to be about the same. One or both internal optical waveguides 143, 144 includes an optical phase shifter 145, 146 that are used to operate the controllable MZI coupler 140, e.g., in a push-pull configuration.

The optical waveguide loop 126 is a connectable and disconnectable optical path that can provide resonant feedback in the optical waveguide arm 120. The optical path length of the optical waveguide loop 126 is about L1, e.g., between interference regions in the 2×2 optical couplers 141, 142. The optical path length L1 determines the free spectral range of the optical waveguide loop 126. Preferably, the two optical path lengths L1 and L2 are about equal, e.g., so that free-spectral ranges of various elements of the optical resonator 125 are about equal. The optical waveguide loop 126 may optionally include an optical phase shifter 175.

In the optical resonator 125, the various optical phase shifters 145, 146, 175 are typically capable of varying optical path lengths by amounts that are much smaller than L1 and L2. For that reason, variations of the optical phase shifters 145, 146, 175 should not significantly vary the substantial wavelength-independence of the MZI 105. In particular, the substantial wavelength independence results from the substantial equalities of various optical path lengths over various optical waveguides 143, 144, 126 as already described.

The term passband bandwidth as used herein refers to the spectral width of the passband of an optical beam passing through the optical resonator. The optical beam at a particular wavelength is considered to be passed if at least 90% of the beam's intensity passes through the MZI 105. One of ordinary skill in the art would understand how to measure the optical path length of the two waveguide arms 120, 122.

The waveguide 110 can be composed of any material used in guiding optical wavelengths of light, such as semiconductor materials like silicon, dielectric materials such as silicates and silica glass used in Planar Lightwave Circuits (PLCs), or organic polymers such as poly(methyl methacrylate) (PMMA), fluoropolymers or silicone polymers. Some embodiments of the optical resonators 125A-125V include ring resonators, such as all-pass ring resonators.

In some embodiments, where there are only two optical resonators (e.g., any two of the optical resonators 125A-125C), the free spectral ranges of the two optical resonators are different from each other. For example, in some cases such as illustrated in FIG. 1A, the first optical resonator 125A can have a free spectral range of 100 GHz, and the second optical resonator 122B can have a free spectral range of 50 GHz. In other case two or more of the optical resonators (e.g., optical resonators 125B-125C) could have a same free spectral range, so long as at least one other optical resonator (e.g., optical resonator 125A) has a different free spectral range. Such an embodiment can beneficially flatten the transmitted passband and facilitate achieving a faster roll-off of the filter skirt, thereby improving the stopband rejection, e.g., for higher order filter applications (e.g., fourth and higher order filter functions). In other cases, such as when there are more than two optical resonators (e.g., optical resonators 125A-125C) all of the optical resonators 125A-125C can have a different free spectral range than each other. Continuing with the same example, the third optical resonator 125C shown in FIG. 1A can have a free spectral range (e.g., 25 GHz) that is different than the free spectral ranges of the first and the second optical resonators 125A, 125B. Having different free spectral ranges for all of the optical resonators 125A-125C can advantageously provide a greater number of passband bandwidth settings that the MZI 105 can be adjusted to.

In some embodiments, the bandpass filter 105 further includes adjustable optical couplers 140A, 140B, 140C that are each optically coupled to the first arm 120 and to one of the optical resonators (e.g., one of optical resonators 125A, 125B, 125C). In some embodiments, the adjustable optical couplers include Mach-Zehnder interferometers formed from other portions of the same material used to form the waveguide 110. The adjustable optical couplers 140A, 140B, 140C are configured to adjust a fraction (e.g., the optical coupling strength) of an optical beam allowed to pass through the corresponding one optical resonator (e.g., the one optical resonator 125A, 125B or 125C).

Figure 2:
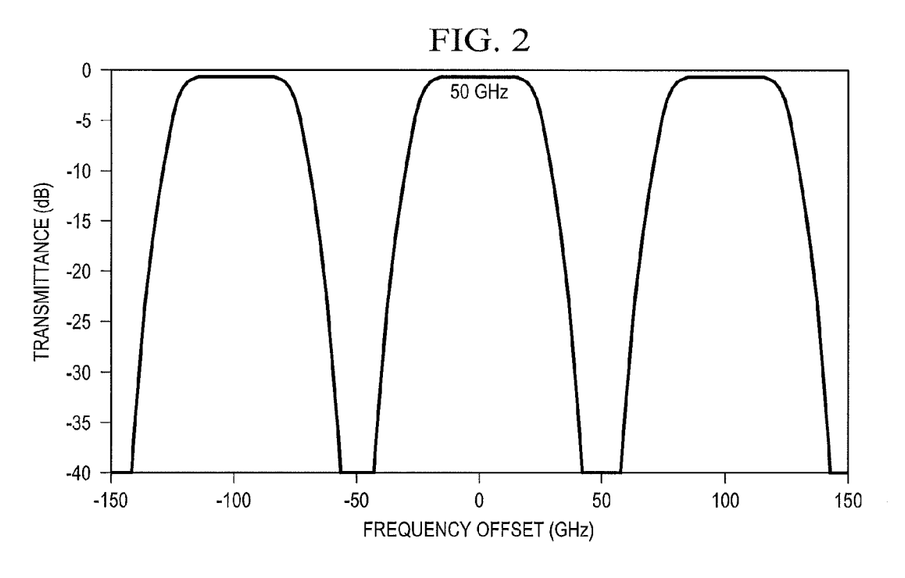
FIG. 2 presents an example transmittance curve for one output of the MZI depicted in FIG. 1A.

For example, consider an embodiment of the MZI 105 having a transmittance curve configured to correspond to a third-order Butterworth filter function. FIG. 2 presents an example of such a transmittance curve, as a function of frequency, for MZI 105 depicted in FIG. 1A in which the bandwidth of the passband equals about 50 GHz. In such embodiments, the adjustable optical coupler that is optically coupled to the corresponding one of the optical resonators (e.g., optical coupler 140C coupled to optical resonator 125C) is configured to adjust a time delay for the optical beam to circulate through the one optical resonator (e.g., optical resonator 125C) to be equal to about two times a time delay for the optical beam to circulate through the second arm 122. In some embodiments, for example, the adjustable optical coupler 140C optically coupled to the corresponding optical resonator 125C is configured to adjust the fraction of the optical beam passing through the optical resonator 125C to equal about one-third of the optical beam passing though the first arm 120 and the other optical resonators 125A, 125B are configured to have none the optical beam circulating through them. In such cases, the optical beam will only propagate through the upper portion of these other optical resonators 125A, 125B, and therefore, the other optical resonators 125A, 125B will provide a delay time that is equal to a fraction of the delay time in the second arm 122. In a non-filtering configuration of the MZI 105, none of the optical beam (e.g., a zero fraction) passes through all of the optical resonators 125A-125C, in which case the delay time in the first arm 120 can be substantially equal to the delay time in the second arm 122.

In some embodiments, all but one of the adjustable optical couplers are configured to prevent an optical beam from passing through the corresponding optical resonators. For example when the first adjustable optical coupler 140A is configured to allow a non-zero fraction of the light beam to circulate in the corresponding optical resonator 125, then the other optical couplers 140B, 140C can be configured to prevent any fraction of the light beam from circulating in the corresponding optical resonators 125B, 125C.

Based on the present disclosure, one skilled in the art would recognize that the MZI 105 could be configured to have other shapes of transmittance curves, and hence different passband bandwidths, by adjusting the time delay, e.g., by adjusting the fraction of light permitted to enter the one optical resonator 125A and not enter the other optical resonators 125B, 125C.

In cases where the light beam is circulated through only one of the optical resonators and is prevented from circulating through other optical resonators, as illustrated in FIG. 2, the transmittance curve can have a plurality of periodic passband bandwidths that are offset at higher and lower frequencies from a center target frequency. In some cases, these offset passbands may allow non-selected optical signals to be undesirably transferred through the filter 105.

In some embodiments, to reduce the amount of optical frequencies transmitted through these offset passbands, the MZI 105 can be configured such that two or more of the adjustable optical couplers allow an optical beam to pass through the corresponding optical resonators, with the corresponding optical resonators tuned to a same optical wavelength. One skilled in the art would understand how to configure the adjustable optical couplers so that the transmittance curve of the MZI 105 define fourth, or higher order, Butterworth filter functions, or other functions configured to reduce the intensity of the optical beam passing through the MZI 105 at the periodic offset passbands frequencies.

Figure 3:
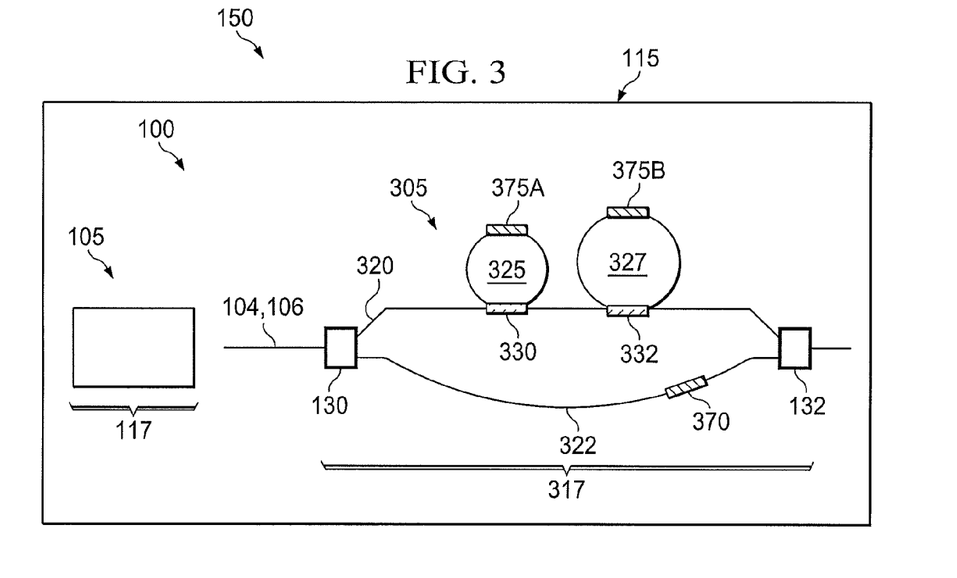
FIG. 3 presents another example layout diagram of an example optical of a MZI that functions as power splitter with an adjustable bandpass.

As an alternative, or additionally, in some embodiments, to reduce the amount of optical frequencies transmitted through the offset passbands, the apparatus 100 can further include a second MZI. FIG. 3 presents another example layout diagram of the apparatus 100 of the disclosure that includes a second MZI 305. For clarity, in FIG. 3, the first MZI 105 is depicted in block form, but could include any of the embodiments of the MZI 105 discussed elsewhere herein. The second MZI 305 is serially optically connected to the MZI 105 (e.g., via outputs 104, 106) and includes a second portion 317 of the waveguide on the planar substrate 115. The second portion 317 of the waveguide has a third arm 320 and fourth arm 322, wherein the third arm 320 is optically couplable to one or more different optical resonators 325, 327. In some embodiments, at least two of the different optical resonators 325, 327 couplable to the third arm 320 have different free spectral ranges than each other. In some embodiments, at least one of the different optical resonators 325, 327 coupled to the second portion 317 of the waveguide 110 has a different free spectral range than the free spectral ranges of the optical resonators 140A, 140B, 140C coupled to the first arm 120 of a first portion 117 of the waveguide 102. In some embodiments, a optical path length of the fourth arm 322 is substantially equal to a sum of the half-lengths of the different optical resonators 325, 327. The second MZI 305 can include optical resonators 330, 332 and optical phase shifters 370, 375A, 375B that are configured analogous to that described for the first MZI 105.

Figure 4:
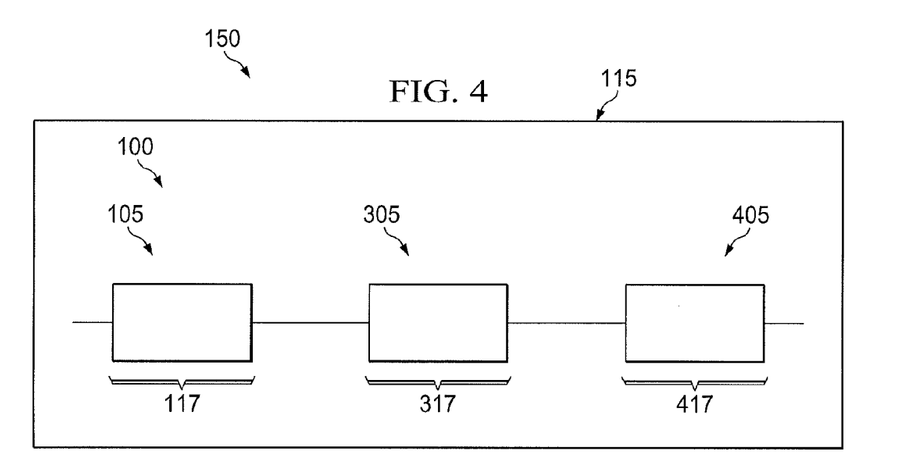
FIG. 4 presents an another example layout diagram of the optical device of the disclosure including three bandpass filters.

One skilled in the art would appreciate, based on the present disclosure, that some embodiments of the apparatus 100 could further include three or more MZIs. FIG. 4 presents an example block layout diagram of the optical device of the disclosure including three MZIs 105, 305, 405. Each of the MZIs can be configured analogous to that shown in FIGS. 1 and 3. For instance, the MZIs 105, 305, 405 can be serially optically connected to each other and include different portions 117, 317, 417 of the waveguide on the planar substrate 115. In some cases, the third portion 417 of the waveguide can have two arms wherein one of the arms are couplable to at least one optical resonator and further include adjustable optical couplers and the arms have lengths analogous to that described from the second MZI 305 described in the context of FIG. 3.

Figure 5:
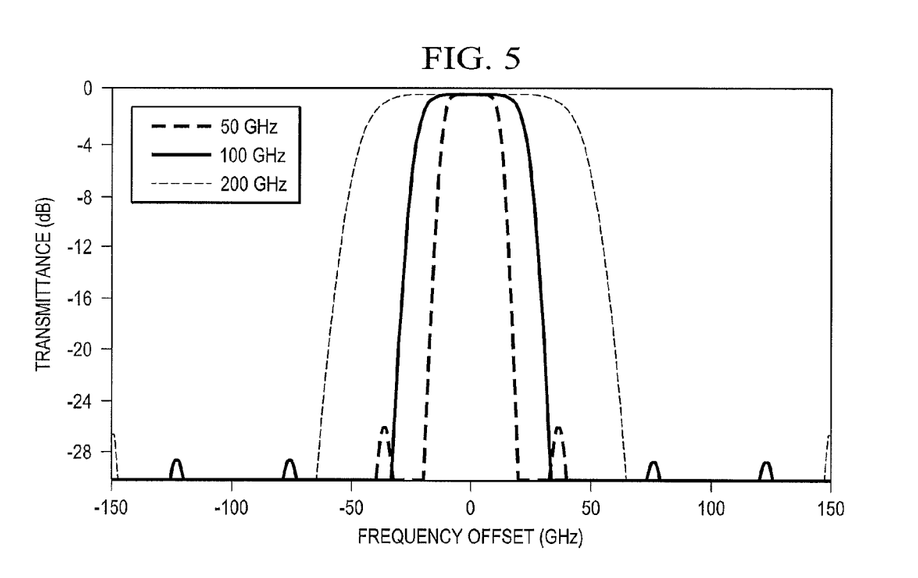
FIG. 5 presents example transmittance curves for the waveguide of the optical device depicted in FIG. 4.

As an example, in some embodiments of the apparatus 100, such as shown in FIG. 4, the first MZI 105 can comprise three optical resonators 125A-125C (FIG. 1A) having bandpass widths of 220 GHz, 100 GHz and 50 GHz, respectively, the second MZI 305 can comprise two optical resonators 325, 327 (FIG. 3) having bandpass widths of 220 GHz and 100 GHz, respectively, and the third MZI 405 can have a single optical resonator having a bandpass width of 200 GHz. FIG. 5 presents different example transmittance curves for the waveguide of the optical device depicted in FIG. 4 configured in accordance with the three example settings as presented below. As illustrated in FIG. 5, for any one of the three example passband settings selected, the offset passbands can be substantially minimized.

In the case where a target 50 GHz passband bandwidth setting is desired, the optical resonators that are coupled to one of the waveguide arms in each of the three MZIs 105, 305, 405 can correspond to the 50 GHz, 100 GHz and 200 GHz optical resonators in the first, second and third filters 105, 305, 405, respectively.

In the case where a target 100 GHz passband bandwidth setting is desired, the optical resonators that are coupled to one of the waveguide arms in each of the three MZIs 105, 305, 405 can correspond to the 100 GHz, 100 GHz and 200 GHz optical resonators in the first, second and third filters 105, 305, 405, respectively. Alternatively, the optical resonator of one of the first or second MZIs 105 305 can be adjusted to not circulate the optical beam.

In the case where a target 200 GHz passband bandwidth setting is desired, the optical resonators that are coupled to one of the waveguide arms in each of the three MZIs 105, 305, 405 can correspond to the 220 GHz, 220 GHz and 200 GHz optical resonators in the first, second and third MZIs 105, 305, 405, respectively. Alternatively, the optical resonator of one of the first or second MZIs 105 305 can be adjusted to not circulate the optical beam.

Figure 6:
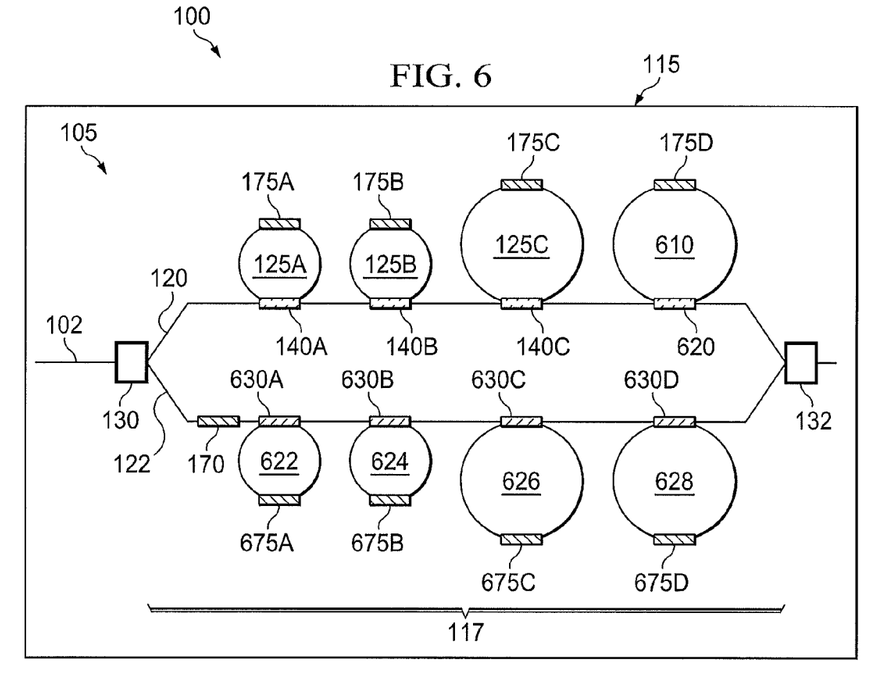
FIG. 6 presents another example layout diagram of an example of a MZI that functions as power splitter with an adjustable bandpass.

In still other embodiments of the apparatus 100, the second arm of the MZI can also be optically couplable to additional optical resonators. Such embodiments can advantageously provide a shaper more box-shaped transmittance curve compared to analogous embodiments without the second arm couplable to optical resonators. FIG. 6 presents another example layout diagram of an example optical apparatus 100 of the disclosure that is analogous to that shown in FIG. 1A except that there are four optical resonators 125A, 125B, 125C, 610 coupled to the first arm 120 arm via adjustable optical couplers 140A, 140B, 140C, 620. Pairs of the optical resonators (e.g., first pair 120A, 120B and second pair 120C, 610) are configured to have the same free spectral range. The second arm 122 can include additional optical resonators 622, 624, 626, 628 couplable to a second arm 122 of the MZI 105 via adjustable couplers 630A-630D. In some cases, such as shown in FIG. 6, the additional optical resonators 622, 624, 626, 628 can be coupled to optical phase shifters 675A-67D that are configured analogous to that described for the MZI 105 in the context of FIG. 1A.

One of ordinary skill in the art would appreciate that the apparatus 100 could further include other components (e.g., light source, amplifiers, multiplexers, demultiplexers, photodetectors) that are optically coupled directly or indirectly to the MZI 105, as well as other components (e.g., controlling integrated circuits), which in some cases can all be integrated on the same substrate platform.

Figure 7:
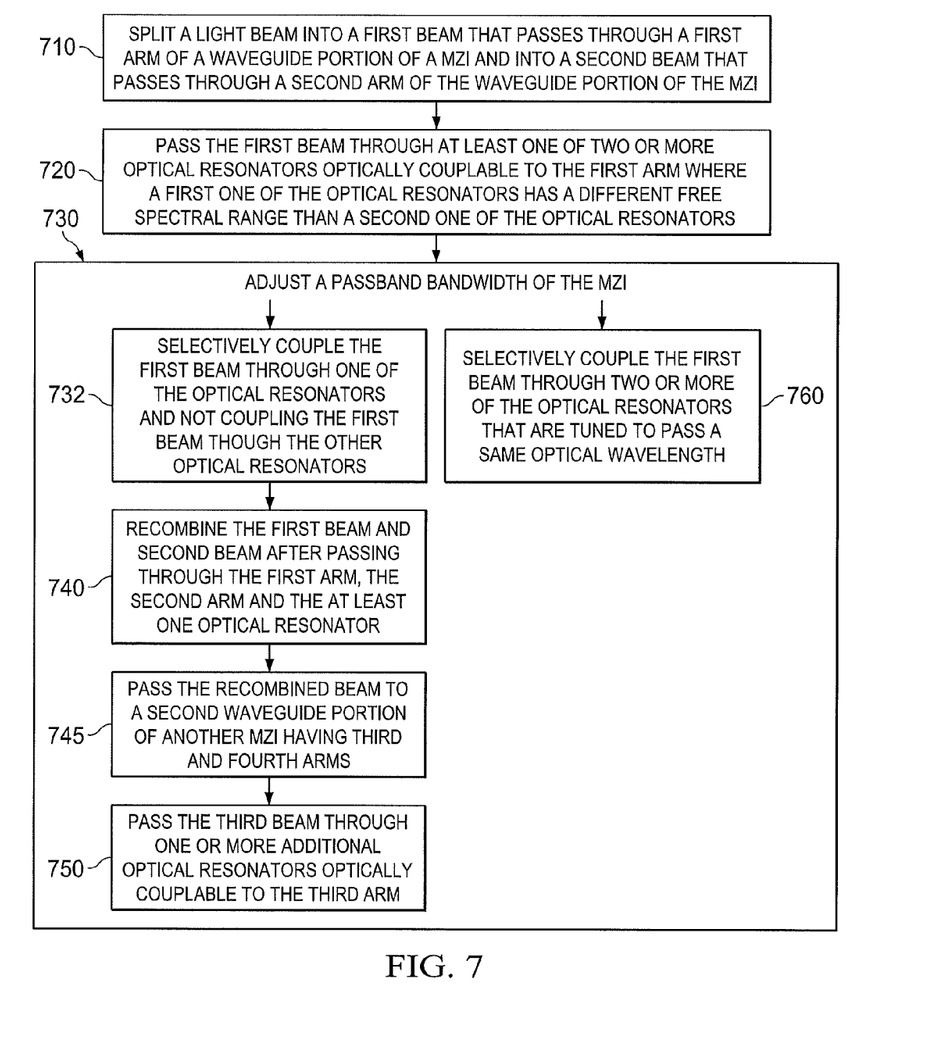
FIG. 7 presents a flow diagram of an example method of using an optical power splitter, such as any of the devices discussed in the context of FIGS. 1-6.

Another embodiment of the disclosure is a method of using an optical device. FIG. 7 presents a flow diagram of an example method of using an optical device, such as any of the devices 100 discussed in the context of FIGS. 1A-6. With continuing reference to FIGS. 1A-6, the method comprises a step 710 of splitting (e.g., via a 1×2 optical coupler 130) a light beam into a first beam that passes through a first waveguide arm 120 of a waveguide portion 117 of a MZI 105 and into a second beam that passes through a second waveguide arm 122 of the waveguide portion 117 of the MZI 105. The method also comprises a step 720 of passing the first beam through at least one of two or more optical resonators 125A-125C optically couplable to the first arm 120, where a first one of the optical resonators (e.g., optical resonator 125A) has a different free spectral range than a second one of the optical resonators (e.g., optical resonators 125B or 125C).

As discussed above in the context of FIG. 1A: a first one of the optical resonators has a different free spectral range than a second one of the optical resonators; a total length of the second arm is substantially equal to a sum of the half-lengths of the optical resonators couplable to the first arm plus a total length of the first arm; and a passband bandwidth of the MZI, when the at least one optical resonator is optically coupled to the first arm, is different than when the one of the other optical resonators is optically coupled to the first arm.

Some embodiments of the method further include a step 730 of adjusting a passband bandwidth of the MZI 105. In some cases adjusting in step 730 can include a step 732 of selectively coupling the first beam through one of the optical resonators (e.g., optical resonator 125) and not coupling the first beam though the other optical resonators (e.g., optical resonators 125B or 125C). For example, in some embodiments, an about one-third fraction of the first beam is coupled into the selected one optical resonator (e.g., optical resonator 125A), therefore forming a transmittance curve that follows a third order Butterworth filter function (e.g., FIG. 2). For example in some embodiments the step 730 of adjusting a bandpass width, includes adjusting a time delay for the first beam to circulate through the one optical resonator (e.g., optical resonator 125A) to equal about two times a time delay for the second beam to circulate through the second waveguide arm 122.

In some embodiments of the method adjusting the passband bandwidth in step 730 further includes a step 740 of recombining (e.g., via a second 1×2 optical coupler 132) the first beam and second beam after passing through the first waveguide arm 120, the second waveguide arm 122 and the at least one optical resonator (e.g., optical resonator 125A). Some embodiments of step 740 also include a step 745 of passing the recombined beam to a second waveguide portion 317 of another MZI 305, the second waveguide portion 317 configured to split the recombined beam into a third beam that passes through a third waveguide arm 320 of the second waveguide portion 317 and into a fourth beam that passes through a fourth waveguide arm 322 of the second waveguide portion. Some embodiments of step 740 further include a step 750 of passing the third beam through one or more additional optical resonators 330, 332 optically couplable to the third waveguide arm 320 optical phase shifter 375A, 375B. For instance, in some cases a first one of the additional optical resonators 330 has a different free spectral range than a second one of the additional optical resonators 332.

In some embodiments of the method of adjusting the bandpass width in step 730 can additionally or alternatively include a step 760 selectively coupling the first beam through two or more of the optical resonators (e.g., two of optical resonators 125A-125C) that are tuned to pass a same optical wavelength.

Although the embodiments have been described in detail, those of ordinary skill in the art should understand that they could make various changes, substitutions and alterations herein without departing from the scope of the disclosure.

What is claimed is:

1. An apparatus, comprising:
    a Mache-Zehnder interferometer, the Mache-Zehnder interferometer including:
        a 1×2 optical splitter having an optical input;
        a 2×2 optical coupler having first and second optical outputs;
        first and second optical waveguide arms end-connecting each optical output of the 1×2 optical splitter to a corresponding optical input of the 2×2 optical coupler;
        a variable optical phase shifter on one of the waveguide arms; and
        a plurality of optical resonators each being controllably coupled along the first optical waveguide arm, wherein a first one of the optical resonators has a different free spectral range than a second one of the optical resonators.

2. The apparatus of claim 1, wherein a ratio of a power transmitted by the first optical output of the 2×2 optical coupler over a power transmitted by the second optical output of the 2×2 optical coupler is substantially wavelength independent over the optical telecommunications C band.

3. The apparatus of claim 2, wherein the ratio varies by 10 percent or less over the C band in response to the optical phase shifter being set to transmit about the same power to both optical outputs of the 2×2 optical coupler at one wavelength of the C band.

4. The apparatus of claim 2, wherein the ratio varies by 2 percent or less over the C band in response to the optical phase shifter being set to transmit about the same power to both optical outputs of the 2×2 optical coupler at one wavelength of the C band.

5. The apparatus of claim 1, wherein the plurality of optical resonators are each coupled to the first waveguide arm by a corresponding adjustable Mache-Zehnder interferometer.

6. The apparatus of claim 5, wherein each adjustable Mache-Zehnder interferometer is substantially wavelength independent over the optical telecommunications C band.

7. The apparatus of claim 1, wherein the Mache-Zehnder interferometer is configured to combine light from the first and second optical waveguide arms with one relative phase for transmission to the first optical output of the 2×2 optical coupler and to combine the light with a substantially different relative phase for transmission to the second optical output of the 2×2 optical coupler.

8. The apparatus of claim 1, further comprising a controller of the Mache-Zehnder interferometer, the controller being configured to prevent more than one of the optical resonators from being coupled to the Mache-Zehnder interferometer at the same time.

9. The apparatus of claim 1, wherein one of the optical outputs of the Mache-Zehnder interferometer can be operated as an optical bandpass filter.

10. The apparatus of claim 1, further including:
    a second Mache-Zehnder interferometer that is serially optically connected to the Mache-Zehnder interferometer, wherein:
        the second Mache-Zehnder interferometer include a different portion of a waveguide forming the first or second optical waveguide arms, and
        the different portion of the waveguide has a third optical waveguide arm and fourth optical waveguide arm, wherein the third optical waveguide arm is optically couplable to a different plurality of optical resonators.

11. The apparatus of claim 10, wherein at least one of the different plurality of optical resonators coupled to the third optical waveguide arm has a different free spectral range than the free spectral ranges of the optical resonators coupled to the first optical waveguide arm.

12. The apparatus of claim 10, wherein a total length of the fourth optical waveguide arm is substantially equal to a sum of the optical half-lengths of the different plurality of optical resonators couplable to the third optical waveguide arm plus a total length of the third optical waveguide arm.

13. The apparatus of claim 1, wherein the second optical waveguide arm is optically couplable to additional optical resonators, wherein the additional optical resonators are equal in number, and have same free spectral ranges, as the optical resonators optically couplable to the first optical waveguide arm.

14. The apparatus of claim 1, wherein an optical path length between the optical input of the 1×2 optical coupler and the first optical output of the 2×2 optical coupler is substantially the same via the first optical waveguide arm and the second optical waveguide arm when the optical resonators are decoupled from the optical waveguide arms.

15. The apparatus of claim 1, wherein each of the optical resonators coupled to the first optical waveguide arm have a different free spectral range than each other.

16. The apparatus of claim 1, wherein the first optical resonator has a different physical loop length than a physical loop length of the second optical resonator.

17. The apparatus of claim 1, wherein each of the optical resonators coupled to the first optical waveguide arm have a free spectral range that differ by at least about 25 GHz.

18. The apparatus of claim 1, wherein each of the optical resonators coupled to the first optical waveguide arm have different physical loop lengths.

19. The apparatus of claim 1, wherein a first pair the optical resonators coupled to the first optical waveguide arm have a same first free spectral range and second pair of the optical resonators coupled to the first optical waveguide a same second free spectral range, and, the first same free spectral range is different from the second same free spectral range.

20. A method of using an apparatus, comprising:
    splitting a light beam into a first beam that passes through a first optical waveguide arm of a Mache-Zehnder interferometer and a second light beam that passes through a second optical waveguide arm of the Mache-Zehnder interferometer; and
    passing a portion of the first beam through at least one of two or more optical resonators optically coupled to the first waveguide arm by variable optical couplers, wherein:
        a first one of the optical resonators has a different free spectral range than a second one of the optical resonators.

21. The method of claim 20, further including adjusting the passband bandpass width by selectively coupling the first beam through one of the optical resonators and not coupling the first beam though the other optical resonators.

22. The method of claim 21, wherein an about one-third fraction of the first beam is coupled into the selected one optical resonator.

23. The method of claim 21, wherein adjusting the passband band width further includes:
  recombining the first beam and second beam after passing through the first optical waveguide arm and the second optical waveguide arm and the at least one optical resonators;
  passing the recombined beam to another Mache-Zehnder interferometer configured to split the recombined beam into a third beam that passes through a third optical waveguide arm and into a fourth beam that passes through a fourth optical waveguide arm; and
  passing the third beam through one or more additional optical resonators optically couplable to the third optical waveguide arm.

24. The method of claim 23, wherein the third optical waveguide arm is optically couplable to two or more of the one or more additional optical resonators and at least one of the one or more additional optical resonators has a different free spectral range than the other one or more additional optical resonators,
  a total optical path length of the fourth optical waveguide arm is substantially equal to a sum of the optical path half-lengths of the one or more additional optical resonators couplable to the third optical waveguide arm plus a total optical path length of the third optical waveguide arm, and
  a passband bandwidth of the bandpass filter, when the at least one of the one or more additional optical resonators is optically coupled to the third optical waveguide arm, is different than when the one of the other one or more additional optical resonators is optically coupled to the third optical waveguide arm.

25. The method of claim 20, wherein adjusting the pass band bandwidth further includes:
  selectively coupling the first beam through two or more of the optical resonators that are tuned to pass a same optical wavelength.

26. The method of claim 20, wherein a total optical path length of the second optical waveguide arm is substantially equal to a sum of the optical path half-lengths of the optical resonators couplable to the first optical waveguide arm plus a total optical path length of the first optical waveguide arm.

27. The method of claim 20, wherein a passband bandwidth of the Mache-Zehnder interferometer, when the at least one optical resonator is optically coupled to the first waveguide arm, is different than the passband bandwidth, when one of the other optical resonators is optically coupled to the first passband bandwidth waveguide arm.

* * * * *